Aug. 6, 1940.    A. V. WETHERBY-WILLIAMS ET AL    2,210,017
STERILE FILLING MACHINE
Filed May 26, 1939    2 Sheets-Sheet 1
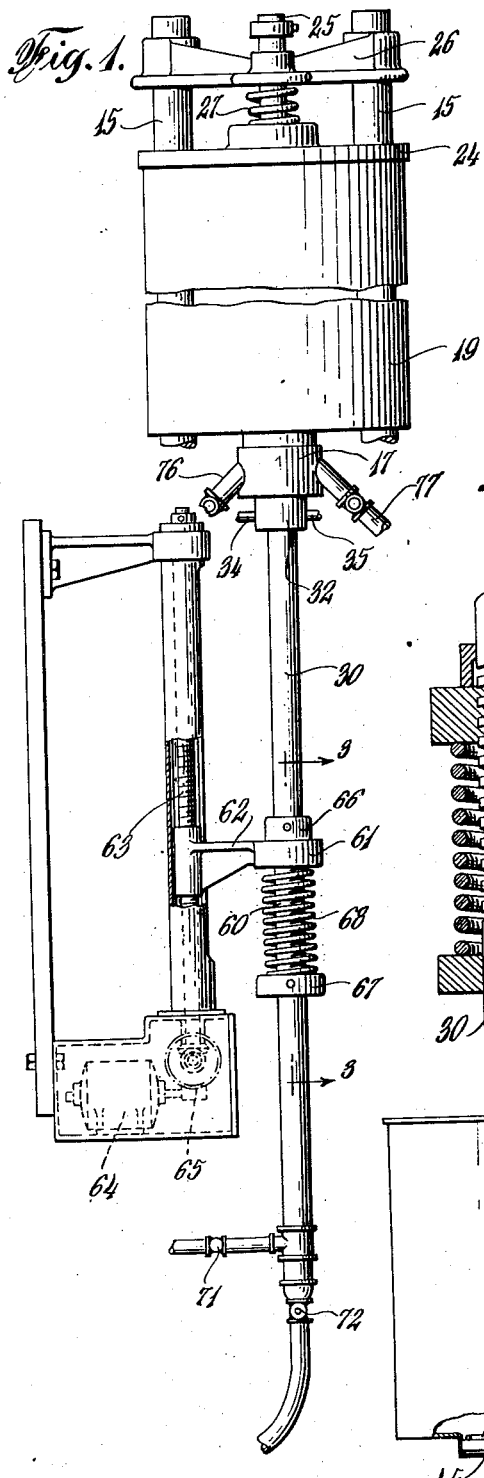
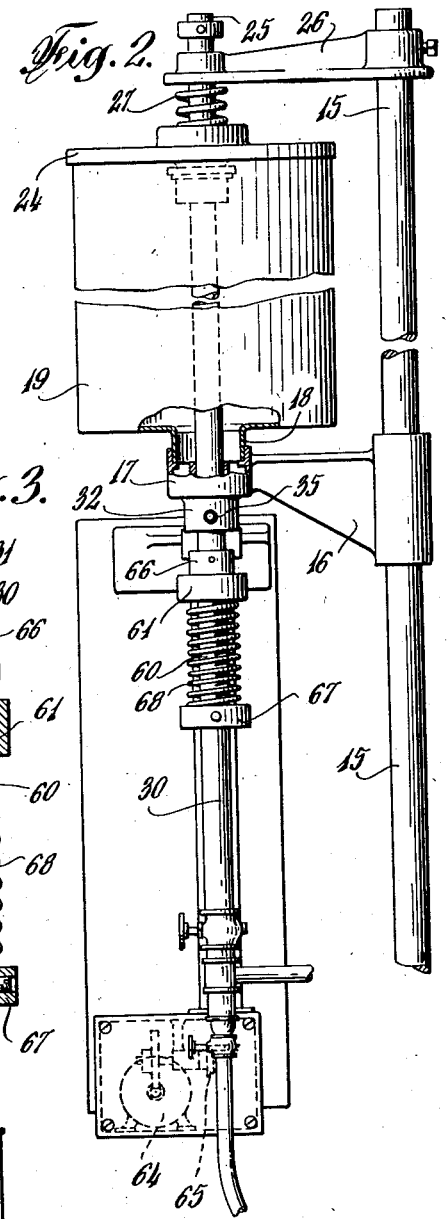
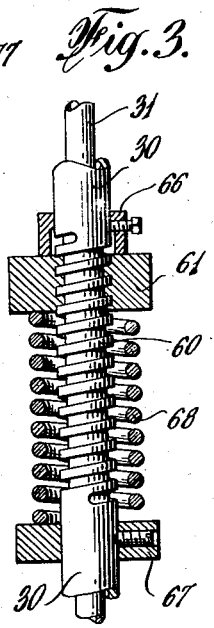
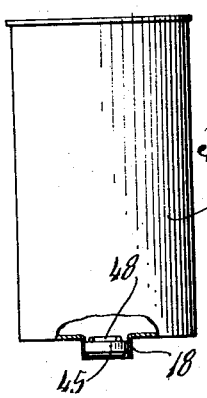
INVENTORS
Arthur Vivian Wetherby-Williams
and Washington Kyle Sheffield
BY
their ATTORNEY

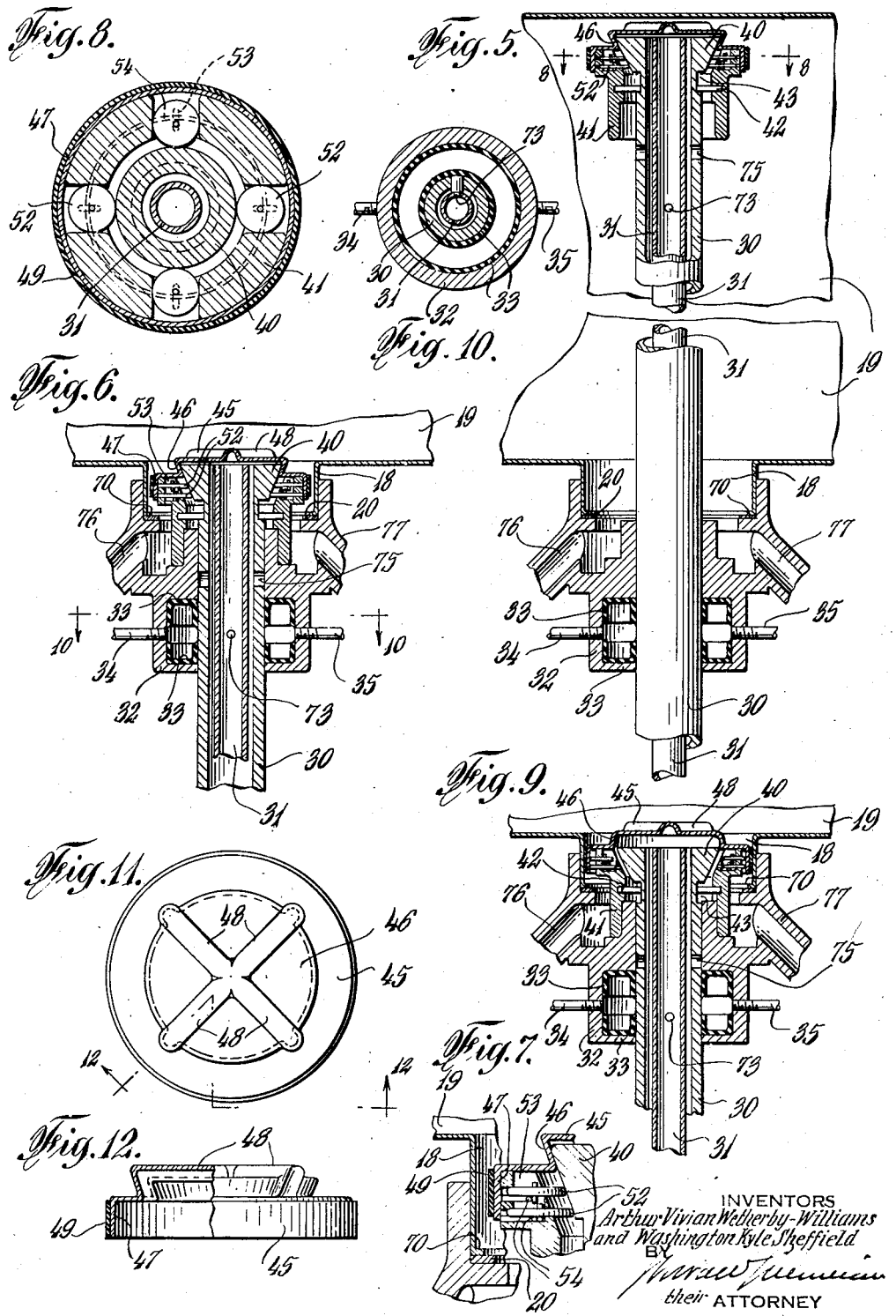

Patented Aug. 6, 1940

2,210,017

UNITED STATES PATENT OFFICE 2,210,017

STERILE FILLING MACHINE

Arthur Vivian Wetherby-Williams and Washington Kyle Sheffield, New York, N. Y.

Application May 26, 1939, Serial No. 275,842

10 Claims. (Cl. 226—68)

Our invention relates to apparatus for filling and closing vessels and more particularly apparatus of that type in which the vessel is first sterilized and subsequently filled and closed without danger of introducing bacteria into the vessel between the time sterilization ends and the time the vessel has been hermetically sealed.

Apparatus of this type permits bulk pasteurization followed by quick cooling before the liquid is introduced into the vessel which is to contain it. Cold filling has the advantage over hot filling in that the flavor of many fruit juices, dry wines, etc., does not deteriorate after rapid pasteurization, followed immediately by cooling. By cold filling, it is possible to preserve the vitamins, especially vitamin C, which were in the liquid initially. Also, by this type of pasteurization it is possible to use up to 75% heat regeneration, which makes a marked saving in the cost of heating the liquid from normal to pasteurizing temperature.

One of the principal objects of our invention is to provide means operable from outside the apparatus for expanding a soft metal closure into hermetically tight engagement with the mouth of the vessel after it has been filled. Heretofore, in apparatus of the type to which this invention relates the vessels to be filled are inverted while they are being sterilized, to permit the condensate to drain away. Then, before filling them with liquid, they have been turned right-side up, so that the liquid could run in by gravity and displace air through the mouth of the vessel which was then at the top of the latter. This procedure is highly objectionable in the case of liquids, such as beer, which are apt to foam when allowed to drop from a height.

Another important object, therefore, of our invention is to provide means whereby an inverted vessel can first be sterilized, then filled with liquid and finally sealed without turning the vessel right way up.

With this object in view the apparatus includes a tube carrying the closure at its upper end capable of being thrust upwardly through the mouth of the vessel, while the latter is inverted, until it is closely adjacent what is normally the bottom of the vessel. Closing the space between the mouth of the vessel and such tube is a filling member through which condensate from the steam used for sterilizing can be discharged and subsequently beer or other liquid can be introduced.

One suitable form of construction is shown, by way of example, in the accompanying drawings, wherein:

Figure 1 is a front elevation of the apparatus as a whole.

Figure 2 is a side elevation of the same.

Figure 3 is a section on the line 3—3 of Figure 1.

Figure 4 is a side elevation of the container with the closure in position.

Figure 5 is a vertical section through the container, the sterilizing, filling and closure expanding apparatus in initial position.

Figure 6 is a view similar to Figure 5 showing the position of the parts at the beginning of the closure expanding operation.

Figure 7 is a detail view on an enlarged scale of a part of the closure expanding apparatus.

Figure 8 is a section on the line 8—8 of Figure 5.

Figure 9 is a view similar to Figure 6 showing the position of the parts at the end of the closure expanding operation.

Figure 10 is a section on the line 10—10 of Figure 6.

Figure 11 is a top plan view of the closure.

Figure 12 is a view taken on the line 12—12 of Figure 11.

Referring to the drawings, the apparatus comprises a pair of columns 15 carrying a bracket 16, the outer end of which consists of the filling head 17. The filling head has a circular recess at its upper side to receive the mouth 18 of the vessel 19 to be filled. An annular gasket 20 is provided at the bottom of this recess against which the mouth 18 is forced to ensure a fluid-tight contact.

Above the vessel 19 is a downwardly flanged plate 24 having a stud 25 extending upwardly therefrom. This stud slidingly extends through a bracket 26. Between the lower side of the bracket and the top of the plate 24 is a spring 27 to keep the plate pressed against the bottom of the vessel and thereby keep the mouth of the vessel pressed against the gasket 20. To insert an empty vessel or remove a filled one, all that has to be done is lift the plate 24 by pulling upwards on the stud 25.

Slidably mounted in the filling head is a steam pipe 30, within which is the snifter tube 31, through which air is discharged while the vessel 19 is being filled. A gland 32 containing two annular rubber composition packing rings 33 is provided for maintaining a tight joint between the head 17 and the pipe 30. Steam under greater pressure than the pressure in the vessel at any time is admitted into the interior of the gland through a pipe 34 to press the packing rings against the pipe 30. With such an arrangement, if there is any leakage into the vessel, it is of sterile steam. Condensate is discharged through pipe 35.

The upper end of the pipe is flared out conically to form a head 40. Surrounding such head and a little below it is a closure-expanding member 41 mounted on the head so that it can freely turn thereon and, at the same time, move axially relatively thereto through a short distance. This limited freedom of relative movement may be secured in a number of ways, such as by mounting a series of pins 42 on the member 41, the inner ends of which extend into an annular recess 43 in the outer wall of the pipe 30.

A closure generally designated as 45 of soft metal constructed as shown more particularly in Figure 12 has a central portion 46 adapted to be snapped over the head 40 and an outer depending cylindrical skirt part 47 which surrounds the upper portion of the member 41. Ribs 48 are provided in the central portion 46, partly to provide strength and partly to provide channels for the passage of air from the interior of the vessel to the snifter tube 31 as the vessel is being filled with liquid. Around the periphery of the skirt part 47 is a rubber band 49 to act as a gasket between the mouth 18 and the skirt when the latter has been peripherally expanded.

For expanding the skirt 47, various means may be employed. As shown, these means comprise four knurled rollers 52, mounted for radial movement in slots 53 in the member 41. Circular wire springs 54 (Figure 9) serves to draw the rollers inwardly so that they are always in contact with the conical surface of the head 40. If the head 40 is moved downwardly relatively to the member 41, these rollers are pushed outwardly and force the adjacent parts of the skirt 47 outwardly until contact between the gasket 49 and the inner wall of the vessel mouth prevents further movement. This change in the relative position of the parts is shown in Figures 6, 7, 8, and 9. Until this contact takes place, there is nothing to prevent the closure 45 and the member 41 rotating with the head 40 as if all three parts were integrally joined together. As soon, however, as the gasket is squeezed against the inner wall of the vessel mouth the skirt of the closure is gripped frictionally and further rotation of the closure is greatly retarded, if not wholly prevented. The result is that, if after such frictional engagement occurs, the head 40 is rotated, the knurled rollers will be rolled around on the inner wall of the skirt, forcing the gasket 49 into fluid-tight contact at all points between the mouth 18 on the inside and the closure skirt 47 on the outside.

During this rolling operation, the member 41 turns at approximately half the speed of the head 40 to permit true rolling action, with little or no slippage, between the rollers and both the closure and the head 40. In this respect the member 41 acts like the cage of the balls in a ball bearing.

The above-mentioned relative rotary movements of the parts 40 and 41 may be brought about in various ways. One convenient method is to form on the lower part of the steam pipe 30 a screw thread 60 of sufficiently large pitch to permit the pipe to be rotated by moving an internally threaded block 61 in engagement with the screw thread 60 axially with respect to the pipe. The block 61 forms part of a bracket 62 mounted on a feed-screw 63 adapted to be rotated by a motor 64 through worm and other gearing 65. Above the block 61 is a collar 66 and below it a second collar 67. Between the bottom of the block 61 and the collar 67 is a spring 68. When the block 61 is raised it pushes the pipe 30 upwards until the parts are in the position shown in Figure 5. When the block 61 is moved downwardly the pipe 30 and member 41 drop freely until the bottom of the member 41 contacts the filling head, as shown in Figure 6. As the block 61 continues its downward movement, the head 40 moves downwardly inside the member 41 forcing the rollers 52 outwardly until further movement of the rollers is prevented by the engagement of the gasket 49 with the inside of the mouth 18. The parts are then in the position shown in Figure 9. Since the head 40 is no longer able to move downwardly, further downward movement of the block 61 simultaneously compresses the spring 68 and rotates the tube 30 and its head 40 to roll the whole of the skirt of the closure against the inner wall of the vessel mouth. To advantage the mouth 18 has a shallow inwardly extending flange 70, best shown in Figure 7, to prevent the closure being blown out of the mouth 18 by the pressure of carbon dioxide, or the like, within the filled vessel.

It will be noted that the mouth of the vessel is supported against lateral distortion by the filling head which surrounds such mouth to a height above the uppermost line of rollers. Further, the downward thrust produced by the engagement of the conical surface of the head 40 with the rollers 52 is transferred to the filling head, as the result of the member 41 seating thereon. It follows, therefore, that, so far as the closure 45 and the mouth 18 of the vessel are concerned, the only pressure exerted thereon is directed radially outwards, so that there is no strain placed on the body of the vessel. Hence the body of the vessel can be made of waxed paper, Cellophane or other light materials without interfering with the operation of the closure expanding apparatus.

Admission of steam into the space between the pipe 30 and the snifter tube 31 is controlled by a valve 71. Escape of air from the lower end of the tube 31 is controlled by a valve 72. The upper end of the tube 31 is held in proper spaced relation to the pipe 30 by a pin 73.

While steam could escape from the top of the pipe 30 as the closure does not fit tightly thereon, the force of the escaping steam might lift off the closure. Further, the escaping steam would be directed downwardly. For these and other reasons, we prefer that the majority at least of the steam be discharged laterally through apertures 75 formed in the pipe below the bottom of the member 41.

To enable the vessel to be filled practically completely there are no discharge apertures in the snifter tube 31, so that before liquid can enter such tube the liquid level must rise to the top of the tube, and the top of the tube can be raised so that it is below the bottom of the container by a distance not substantially greater than the thickness of the closure 45. For uniform filling, liquid may be allowed to flow into the vessel until it is seen to overflow through the snifter tube, a sight glass being provided for that purpose.

If it is desired to remove substantially all the air in the space above the liquid, the snifter tube may be connected to a vacuum pump.

In the filling head are two passageways 76 and 77 for the liquid to be inserted in the vessel and for the condensate from the sterilizing steam, respectively. Suitable valves, not shown, control the flow of fluid through these passageways.

The initial position for operating the apparatus is that shown in Figure 6, with the tube 30, its head 40 and member 41 in the position shown therein. The first step is to snap one of the closures over the top of the head 40 and then replace a vessel 19 in position thereabove. Then the motor 64 is set in operation to raise the pipe 30. When the openings 75 are clear of the filling head, the steam valve 71 and the valve for condensate discharge through the passageway 77 are opened. By the time that the head 40 has reached the position shown in Figure 5, the interior of the vessel has been sterilized. The steam and condensate valves are closed and the valve controlling the admission of liquid through the passageway 76 and the snifter tube valve 72 are opened and held open until the vessel has been filled. When that has occurred the last-mentioned valves are closed and the motor operated to draw the pipe 30 downwards until the closure has been expanded into contact with the vessel mouth. The filled vessel is removed and the motor 64 operated to bring the head 40, etc., back to the relative positions shown in Figure 6.

If desired, automatic controls may be used for operating the motor switch, valves, etc.

We do not limit ourselves to particular size, shape, number, or arrangement of parts, as shown and described, as these are given simply as a means for clearly describing the device of our invention.

What we claim is:

1. Apparatus for filling and closing a vessel having a neck, comprising a filling head adapted to make fluid-tight contact with the vessel when the latter is in inverted position, a snifter-tube mechanism mounted in said filling head adapted to support a soft-metal dished closure on its upper end, the maximum diameter of the said mechanism being sufficiently smaller than the minimum diameter of the vessel neck to permit said mechanism with a closure covering and surrounding its upper end to enter the vessel and carry the closure to the bottom of the vessel and subsequently lower it into the neck after the vessel is filled, means for moving said mechanism up and down with respect to the filling head, and means for expanding the closure after it has been lowered into the neck to seal the vessel.

2. Apparatus for sterilizing, filling and closing a vessel having a neck, comprising a filling head adapted to make fluid-tight contact with the vessel when the latter is in inverted position, a snifter-tube mechanism slidably mounted in said filling head, said head having apertures between the line of fluid-tight contact and said mechanism for the admission of liquid into the vessel and for the discharge of condensate therefrom, said mechanism being adapted to support a soft-metal dished closure on its upper end, the maximum diameter of said mechanism being sufficiently smaller than the minimum diameter of the vessel neck to permit said mechanism with a closure covering and surrounding its upper end to enter the vessel and carry the closure to the bottom of the vessel and subsequently lower it into the neck after the vessel is filled, means for moving said mechanism up and down with respect to the filling head, an internally-threaded member engaging an external steep-pitch thread on the outside of the lower part of the snifter-tube mechanism, a collar on said mechanism below said member, a helical spring around said mechanism between said member and said collar, a second collar on said mechanism above said member to limit the upward movement of said member under the action of said spring, means for vertically reciprocating said member, the threaded connection between said member and said mechanism causing the latter to be rotated by the member when the latter moves downwardly further than the mechanism can follow it, means operated by the downward and rotary movement of said member for expanding the closure after it has been lowered into the neck to seal the vessel, means for introducing steam into the vessel through said mechanism, and means for discharging air from the vessel through said mechanism.

3. A method of filling a vessel comprising passing a dished closure completely through the mouth of an empty inverted vessel up to the bottom of the latter, introducing steam into the vessel to sterilize it and permitting the condensate to flow therefrom by gravity, then filling the vessel with pasteurized liquid, dropping the closure into the mouth of the vessel and expanding it against the inner wall of the mouth, the vessel remaining in inverted position throughout all of these operations.

4. A method of filling a vessel having a mouth with cool pasteurized liquid comprising placing the vessel in inverted position over a filling head, bringing the vessel and head into fluid-tight contact, introducing steam into said vessel and simultaneously discharging air and condensate therefrom, then introducing cool pasteurized liquid into the vessel, all introductions and discharge of fluids being through the filling head, next expanding a closure into fluid-tight contact with the interior of said mouth by means operable through said filling head and subsequently breaking the fluid-tight contact between the vessel and said head.

5. Apparatus for sterilizing, filling, and closing a vessel comprising a filling head adapted to make fluid-tight contact with the vessel when the latter is in inverted position, snifter-tube mechanism slidably mounted in said head, means for introducing steam into said vessel and discharging condensate therefrom, means for subsequently introducing liquid into said vessel and means for thereafter expanding a closure into fluid-tight contact with the interior of the mouth of the vessel, all of said means being operable after the fluid-tight contact between the filling head and said vessel has been made and before it is broken.

6. Apparatus as in claim 5 in which the snifter-tube mechanism comprises two concentric tubes, means for introducing steam into the space between the tubes and for permitting air to flow out through the central tube, the outer tube having a lateral opening near its upper end for the escape of steam while the inner tube is open at its top for the entry of air.

7. Apparatus as claimed in claim 5 in which the filling head includes a gland surrounding said snifter-tube mechanism, an annular packing of U-shaped cross-section in said gland, and means for supplying steam under pressure to the interior of said packing to press it against said mechanism.

8. Apparatus as claimed in claim 5 in which the filling head includes a gland surrounding said snifter-tube mechanism and means for supplying steam under pressure to the interior of said gland.

9. Apparatus for filling and closing a vessel having a neck comprising a filling head adapted to make fluid-tight contact with the vessel when in inverted position, sniffer-tube mechanism slidably mounted in said filling head, means for introducing liquid through the filling head into the vessel, means for simultaneously discharging gas through the snifter-tube mechanism, a closure-expanding head mounted on the upper end of the snifter-tube mechanism for limited sliding movement relatively thereto, the diameter of said closure-expanding head being sufficiently smaller than the smallest diameter of the neck to permit its entry into the vessel with a closure covering and surrounding it, means for producing relative axial movement of the closure-expanding head and snifter-tube mechanism to expand the former as soon as it has positioned the closure carried thereby within the vessel mouth, means for slidably moving said snifter-tube mechanism up and down in said filling head, and means for rotating said closure-expanding head while it is being expanded.

10. Apparatus for filling and closing a vessel having a neck comprising a filling head adapted to make fluid-tight contact with the vessel when in inverted position, snifter-tube mechanism slidable in said filling head, means for introducing liquid through the filling head into the vessel, means for simultaneously discharging gas through the snifter-tube mechanism, a closure-expanding head mounted on the upper end of the snifter-tube mechanism for limited sliding movement relatively thereto, the diameter of said closure-expanding head being sufficiently smaller than the smallest diameter of the neck to permit its entry into the vessel with a closure covering and surrounding it, the filling head and closure-expanding head being so positioned relatively to each other that the filling head engages and stops further downward movement of the closure-expanding head as soon as the latter has positioned the closure carried thereby within the vessel mouth and before the snifter-tube mechanism has reached its lowermost position, means carried by the snifter-tube mechanism for operating the closure-expanding head as soon as downward movement of the latter has ceased, means for slidably moving said snifter-tube mechanism up and down in said filling head, and means for rotating said last-mentioned means relatively to said closure-expanding head after the latter has engaged said filling head.

ARTHUR VIVIAN WETHERBY-WILLIAMS.
WASHINGTON KYLE SHEFFIELD.